(12) United States Patent
Frahm et al.

(10) Patent No.: US 7,635,184 B2
(45) Date of Patent: Dec. 22, 2009

(54) CLIP-ON SPECTACLES HAVING ELASTIC U-SHAPED BRIDGE

(75) Inventors: Soeren Xerxes Frahm, Horsens (DK); Robert Byriel Rieder, Horsens (DK)

(73) Assignee: Clip-On Company A/S, Vejle (DK)

( * ) Notice: Subject to any disclaimer, the term of this patent is extended or adjusted under 35 U.S.C. 154(b) by 0 days.

(21) Appl. No.: 12/298,603

(22) PCT Filed: Apr. 27, 2007

(86) PCT No.: PCT/DK2007/000198

§ 371 (c)(1),
(2), (4) Date: Oct. 27, 2008

(87) PCT Pub. No.: WO2007/124746

PCT Pub. Date: Nov. 8, 2007

(65) Prior Publication Data

US 2009/0066909 A1    Mar. 12, 2009

(30) Foreign Application Priority Data

Apr. 27, 2006    (DK)    ................. 2006 00599

(51) Int. Cl.
*G02C 9/00*    (2006.01)
(52) U.S. Cl. ................. 351/47; 351/57; 351/63; 351/126
(58) Field of Classification Search ............. 351/47, 351/48, 57, 58, 44, 41, 158, 124, 126, 128, 351/63; 2/454
See application file for complete search history.

(56) References Cited

U.S. PATENT DOCUMENTS

| | | | |
|---|---|---|---|
| 5,123,724 A | 6/1992 | Salk | |
| 5,642,177 A | 6/1997 | Nishioka | |
| 5,920,370 A | 7/1999 | Glanzbergh | |
| 6,022,105 A | 2/2000 | Lin | |
| 6,409,335 B1 | 6/2002 | Lipawsky | |
| 6,557,996 B2 | 5/2003 | Lavie | |
| 6,948,810 B1 | 9/2005 | Kim | |
| 7,284,853 B2 * | 10/2007 | Friedman | 351/47 |
| 2005/0206838 A1 | 9/2005 | Chow | |

FOREIGN PATENT DOCUMENTS

| | | |
|---|---|---|
| DE | 42 14 413 A1 | 11/1993 |
| FR | 2 875 914 A1 | 3/2006 |
| NL | 1005929 C2 | 11/1998 |

OTHER PUBLICATIONS

International Search Report for International Application No. PCT/DK2007/000198.

* cited by examiner

*Primary Examiner*—Hung X Dang
(74) *Attorney, Agent, or Firm*—David S. Safran; Roberts Mlotkowski Safran & Cole, P.C.

(57) ABSTRACT

A pair of clip-on spectacles for fastening on another pair of spectacles, where the clip-on spectacles includes a pair of glasses which are interconnected by an resiliently bendable bridge with a hook at the middle of the bridge for fastening behind the bridge of the other spectacles, where the bridge of the clip-on spectacles is resiliently prestressed towards the hook so that by fastening on the other spectacles, the glasses of the clip-on spectacles are pressed against the glasses of the other spectacles.

12 Claims, 10 Drawing Sheets

Fig. 3a
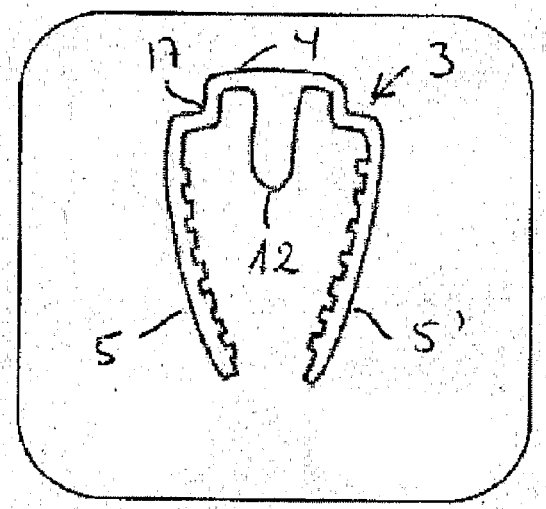
Fig. 3c
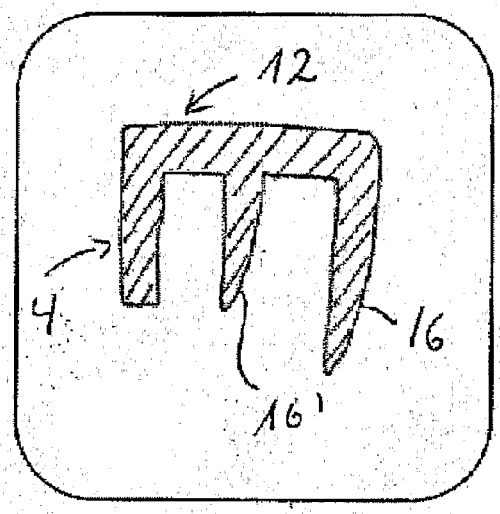
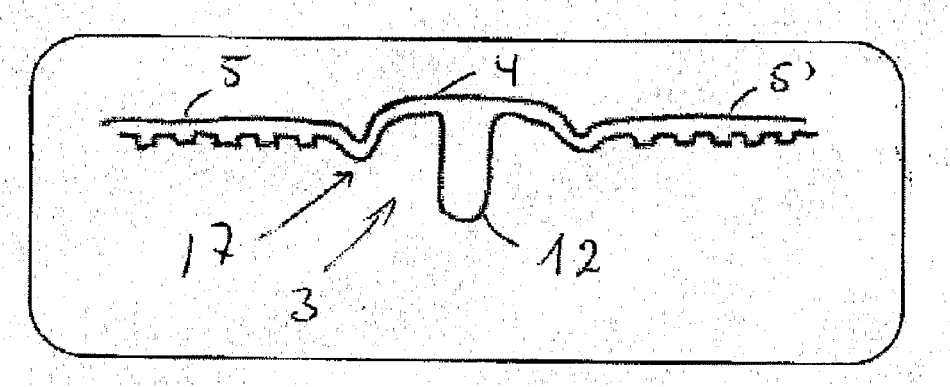
Fig. 3b

CLIP-ON SPECTACLES HAVING ELASTIC U-SHAPED BRIDGE

BACKGROUND OF THE INVENTION

1. Field of Invention

The present invention concerns a pair of clip-on spectacles for fastening on another pair of spectacles, where the clip-on spectacles include a pair of glasses which are interconnected by a bridge.

2. Description of Related Art

Typical clip-on sunglasses are designed with a bridge between two spectacle glasses, where the bridge keeps the glasses of the spectacles at a predetermined distance which is adapted to the spectacles for which the clip-on spectacles are intended. Alternatively, the optician adapts the clip-on spectacles to the individual spectacles in the shop when the customer buys them. In order to keep the glasses of the clip-on spectacles at their correct mutual distance, the bridge also has the task of stabilising the glasses, why the bridge is made of a rigid material. The clip-on spectacles are secured on the spectacles by means of hooks which often scratch the glasses.

However, in order not to be visible in a dominant way, it is sometimes preferred to design the bridge of a thin rigid metal wire. During storage is it a risk that this metal wire is bent or breaks at the point of soldering, which is a great drawback. Also, there is the problem that they are very dominating with regard to appearance when they are put on spectacles, i.e. they are very visible, contrary to the wish that they be largely invisible. Besides, the clip-on glasses are flat, though having the same area as the spectacles, also during storage.

From French Patent FR 2 875 914, a pair of clip-on spectacles is known, with a U-shaped bridge consisting of a mechanical complicated construction. This solution can be compared to the mechanisms known from the connection of a frame and an arm of a pair of spectacles. Such a solution has the one very large drawback that it is a complicated and expensive solution, with a high degree of vulnerability.

SUMMARY OF THE INVENTION

Thus, it is the object of the invention to avoid the above-described drawback.

This object is achieved with a pair of clip-on spectacles, preferably sunglasses, for fastening to another pair of spectacles, where the clip-on spectacles include a pair of glasses which are interconnected by a bridge, where the bridge can yield for collapsing the clip-on spectacles so that the two glasses come into contact with each other or approximately contact each other.

With a pair of clip-on spectacles of this type, unsuitable action on one glass relative to the other glass is avoided during storage, which could result in twisting of the bridge with consequently possible permanent deformation or even entirely destroying the bridge. Besides, the spectacles take up very little space during storage and may e.g. be put down into a pocket and possibly pinch about a shirt pocket.

Clip-on spectacles according to the invention with a yielding bridge may e.g. be made with a hinge, where the two glasses can be collapsed with their back sides against each other.

Prior art clip-on spectacles are provided with a number of hooks on the spectacle glasses for gripping around the glasses or the frames of the spectacle to which the clip-on spectacles are attached. Such hooks easily scratch the glasses or the frame on the spectacles to which the clip-on spectacles are attached, which is definitely a disadvantage. Therefore, in many case it has been decided to provide these hooks with a surface of synthetic material which does not scratch. However, such hooks are expensive to make, which is contrary to the customer's interest in cheap spectacles. Therefore, it is a further object of a development of the invention to provide a pair of clip-on spectacles that utilise a cheaper fastening principle.

This further object is achieved with a pair of clip-on spectacles for fastening on another pair of spectacles, where the clip-on spectacles includes a pair of glasses which are interconnected by an resiliently bendable bridge with a hook at the middle of the bridge for fastening behind the bridge of the other spectacles, where the bridge of the clip-on spectacles is resiliently prestressed towards the hook so that by fastening on the other spectacles, the glasses of the clip-on spectacles are pressed against the glasses of the other spectacles.

As the bridge is prestressed towards the hook, the glasses are pressed against the glasses of the other spectacles, which by itself is sufficient to secure the clip-on spectacles so that the hooks in the glasses or in possible frames around the glasses can be avoided. This considerably reduces the production cost. The bridge is e.g. prestressed in U-shape.

By such a bridge according to the invention, an entirely new principle is utilised where the bridge is not rigid but resiliently bendable. This is founded in the realisation that it is not necessary to reinforce the two clip-on spectacle glasses in relation to each other as long as it is ensured that they are pressed against the glasses of the other spectacles.

In a preferred embodiment, the glasses, or possible frames around the glasses, are provided with projections of synthetic material for bearing against the glasses of the other spectacle in order thereby to keep apart the glasses of the clip-on spectacles and the glasses of the other spectacles. These projections are advantageously made of soft rubber or plastic material, e.g. silicone rubber, which also has great friction against the glass of the other spectacles, in order thereby to ensure a continuous stable disposition of the clip-on spectacles on the other spectacles. The preferred embodiment of a pair of clip-on spectacles according to the invention is without frames around the glasses. The projections may then e.g. be glued directly on the glass, which is a very simple production technique.

The bridge and the spacers can be made of a transparent material so as to be only slightly visible.

In a second embodiment, the bridge is substantially made with a resiliently yielding U-shape in order that during storage of the clip-on spectacles, the two glasses of the clip-on spectacles can be pressed against each other for minimising necessary storage space. The solution according to the invention is cheap and easy in production. As the bridge in beforehand is to be prestressed for pressing the glasses against the glass of the other spectacles, the bridge may advantageously be prestressed to such degree that in the condition without load, it assumes U-shape, where the arms are lying largely in parallel with each other, or even presses the arms so much against each other that the arms are obliquely facing towards each other or are even almost touching each other.

Preferably, the bridge for clip-on spectacles according to the invention is designed so that it may elastically be pressed with a first force from its U-shape into an approximately straight shape, which is the shape used when clip-on spectacles are fitted on another pair of spectacles.

The clip-on spectacles are to be readily adjusted in relation to the spectacles on which the clip-on spectacles are placed, which is preferred by the optician due to the amount of work and by the customer due to the resulting price of the clip-on spectacles. Furthermore, it is a general wish that clip-on spectacles are cheap for the customer. This is allowed for in a further embodiment. There, the bridge has a middle section with a laterally extending hook for fastening behind the glasses of another pair of spectacles as well as two arms extending in continuation of the middle section. The two arms are provided with a number of teeth in succession along the arm, where at each of the glasses of the clip-on spectacles, a fastening means is provided which is adapted to receive a tooth, or several teeth, for fastening the arm in the fastening means, where the length of the bridge between the glasses of the clip-on spectacles is adjustable when selecting the tooth or teeth which is/are fastened in the fastening means.

In a preferred embodiment, the fastening means are U-shaped with two legs between which one of the arms of the bridge are secured, of which the outer side of one leg is fastened to the glass and where the other leg has a cutout for receiving the tooth of an arm. For example, the outer side of one leg may have a bonding surface for bonding on the glass. Alternatively, the fastening means may have parts extending through holes in the glass and with barbs, or which may be deformed by heat after putting them through the holes.

Yet a preferred embodiment of clip-on spectacles according to the invention, where there is possibility of adjustment, is where the two arms are provided each with at least one hole, preferably with several holes in succession along the arm, where at each of the glasses of the clip-on spectacles, holes are arranged where these holes correspond to holes in the arms and where the glasses of the spectacles are fixed with a fastening means, which is adapted to be mounted through the glass and through the arm, where the length of the bridge between the glasses of the clip-on spectacles is adjustable when selecting the positions of glasses, arms and fastening means. A particularly preferred variant is where the glass is adjustable in two directions, preferably in horizontal and vertical directions, where the fastening means is fixed with a lock. This fastening means may advantageously be made with built-in spring action, whereby it is ensured that the joint between glass and arm on the bridge will be stable. For example, the fastening means can be made of an elastic material and with a head having a concave contact face against the glass, so that by fixing of the fastening means, a spring force is achieved in it. Fixing may be effected in that the fastening means is with two pins that correspond to the holes in the glasses as well as in the arms on the bridge, where a locking plate is mounted above the two pins and which is locked together with the pins by means of barbs on pins or in the locking plate. Possible excessive length of the pins may either be cut off or pressed with a tong, whereby the joint can be sealed.

The clip-on spectacles according to the invention thereby becomes universal in use, easy to adapt the width of the spectacles and simultaneously the vertical distance between glass and bridge, and cheap to produce.

Depending on the application of the clip-on spectacles to acetate spectacles or spectacles with metal frame, there is a need for hooks of various lengths on the bridge of the clip-on spectacles. In order to make the spectacles universal in that respect too, the hook has two barbs at different lateral distances from the middle section for adapting to various thicknesses of the bridge of the other pair of spectacles. The barb not needed may possibly be removed by cutting. Furthermore the length of the two arms with the teeth can be adapted by cutting. It is thus an advantage if the bridge is made of synthetic material, in particular a soft but resilient synthetic material.

It is noted that the glasses of the clip-on spectacles, irrespectively of this general term, do not need to be made of glass but may also be made of synthetic material, whereby we are talking about plastic glasses, which moreover are the most common for clip-on sunglasses.

When using synthetic glass, holes or cutouts for mounting on the bridge may advantageously be made with a punching tool which advantageously can be adapted to punch both holes at the same time. Alternatively, the holes or cutouts can be made with a milling tool, which by a machining process forms the desired holes/cutouts at the correct position on the glass. Great flexibility is thus attained, as many different shapes of glass can be adapted to the bridge in innumerable ways and thereby fit to many different pairs of spectacles.

A preferred embodiment of the holes or cutouts is where the internal long sides in the holes are with projections, a kind of points facing into the hole/cutout; with such holes/cutouts there is achieved a stepwise adjustment if the fastening means are with pins dimensioned for the purpose.

By the invention is thus created an exclusive product which is easy to adapt and cheap and readily produced.

The invention is described in more detail with reference to the drawing, where:

BRIEF DESCRIPTION OF THE DRAWINGS

FIG. 3a) and 3b) show the preferred embodiment in various states, and 3c) shows the hook from the side;

DETAILED DESCRIPTION OF THE INVENTION

Figure 1A:
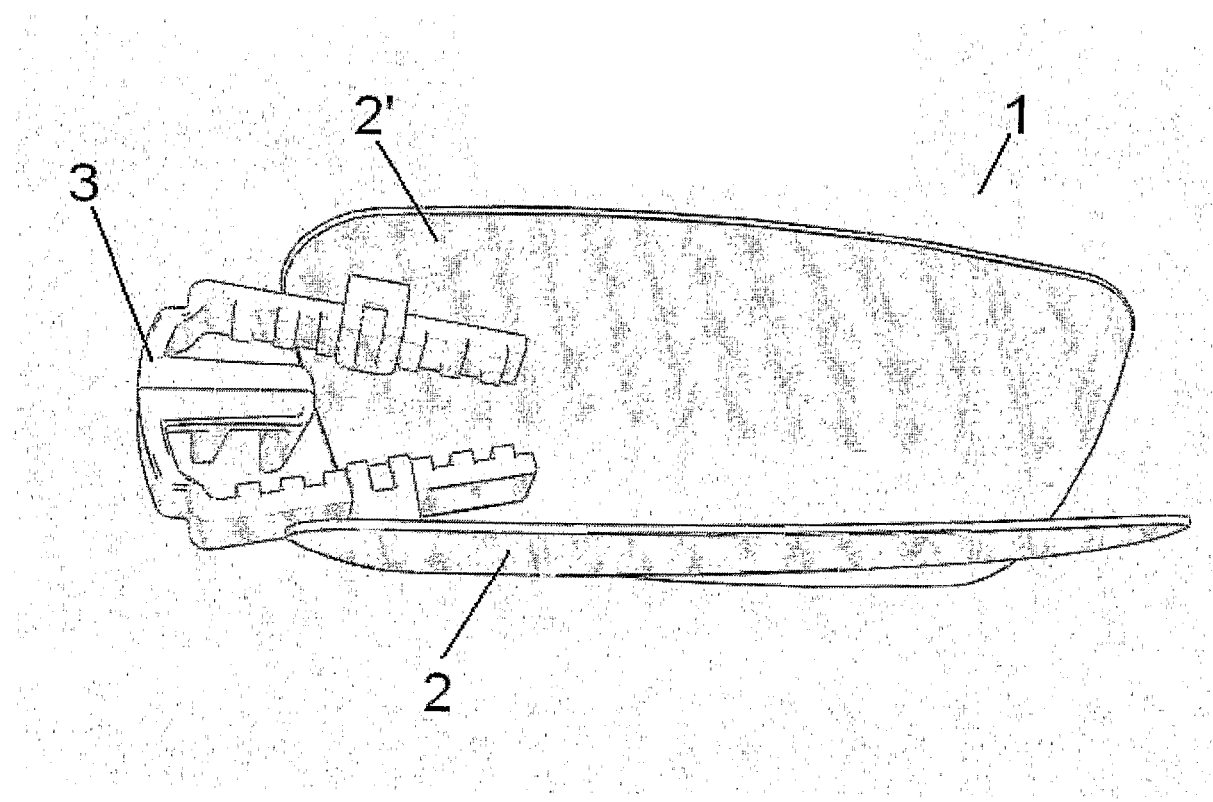
FIG. 1a) shows a pair of clip-on sunglasses in collapsed condition in perspective view, 1b) shows the clip-on spectacles in unfolded condition, and 1c) shows the clip-on spectacles attached to another pair of spectacles.

FIG. 1a) shows a pair of clip-on sunglasses 1 with two sunglasses 2 and 2' which are held together by means of a bridge 3, which in the shown embodiment, due to its elasticity, presses the two spectacle glasses 2 and 2' against each other, so that these are largely in parallel or are pressing against each other at the ends.

Figure 1B:
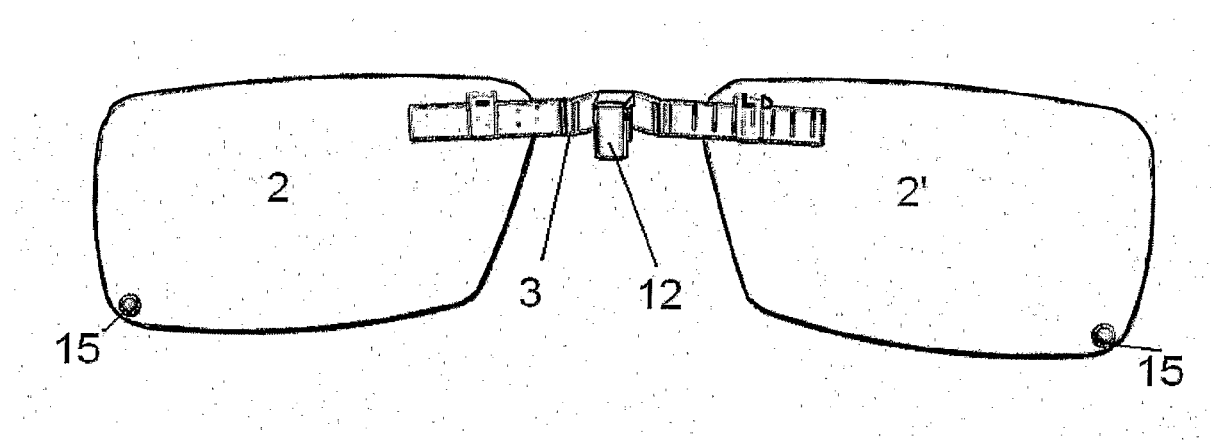

In FIG. 1b) is shows a pair of sunglasses with two glasses 2 and 2' which are interconnected with a bridge 3 in unfolded condition.

Figure 1C:
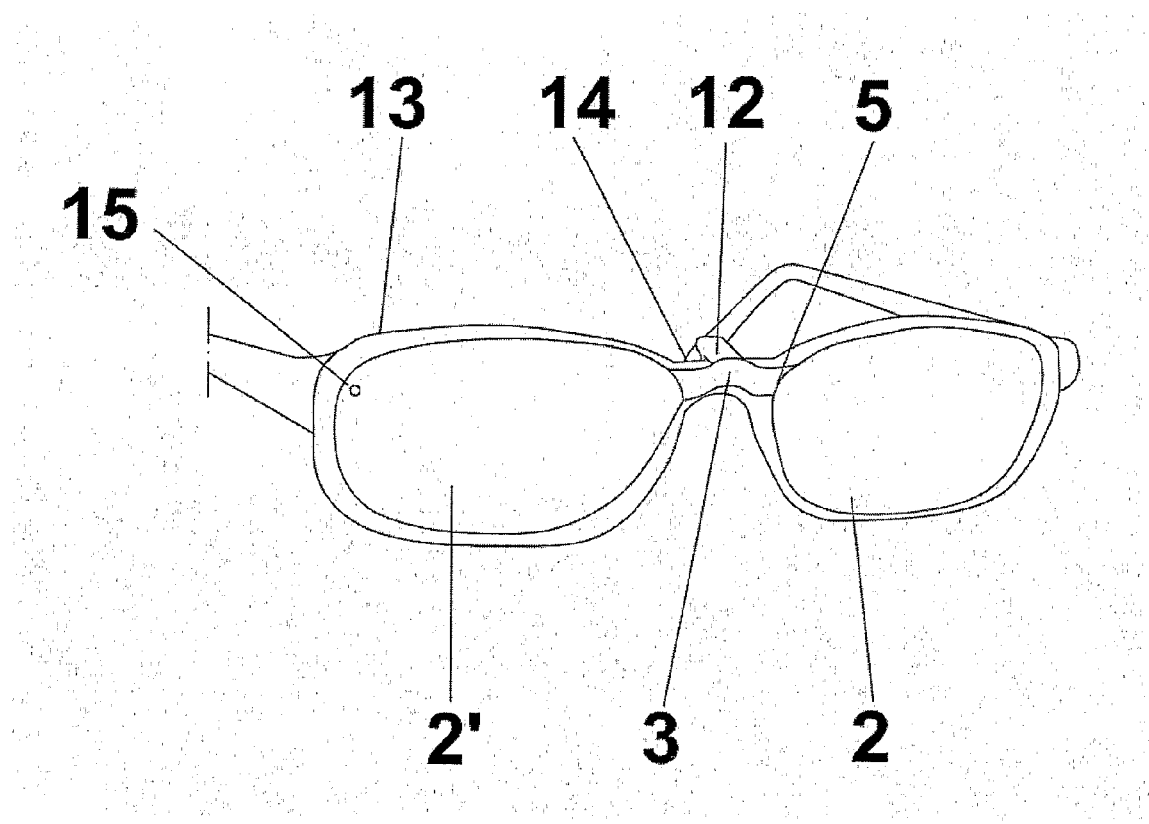

In order that the glasses 2, 2' of the clip-on spectacles do not scratch the glasses of the other spectacles 13, the clip-on spectacle glasses 2, 2' can be provided with spacers 15, as shown on FIGS. 1b and 1c, such as projections of synthetic material, at the rear side of the glasses 2, 2', which rest on the front side of the glasses of the other spectacles 13, forming a spacing—possibly a very small spacing—between the glasses 2, 2' of the clip-on spectacles and the glasses of the other spectacles.

Figure 2A:
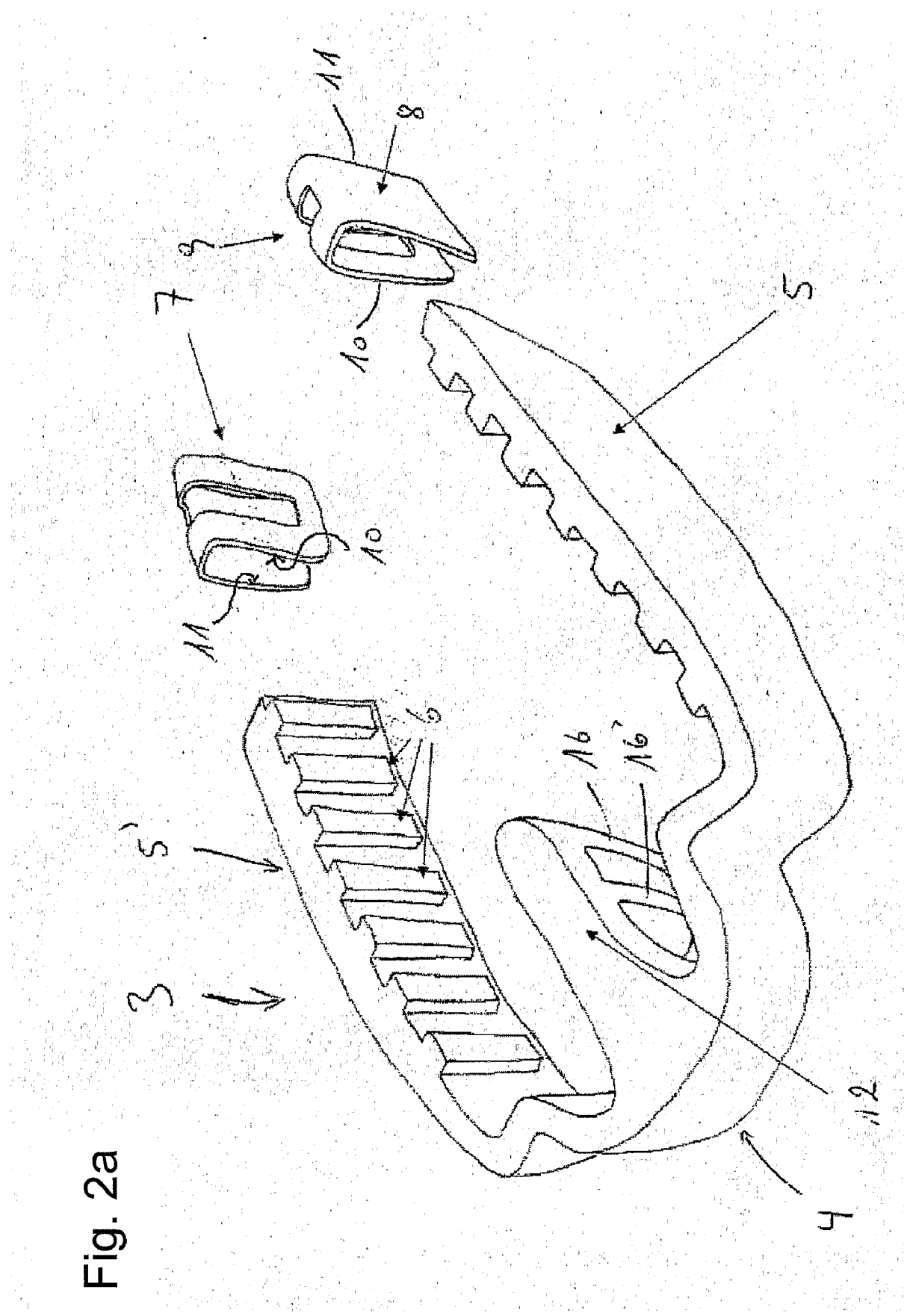
FIG. 2a) shows a bridge according to a preferred embodiment and 2b) a slightly changed version.
Figure 2B:
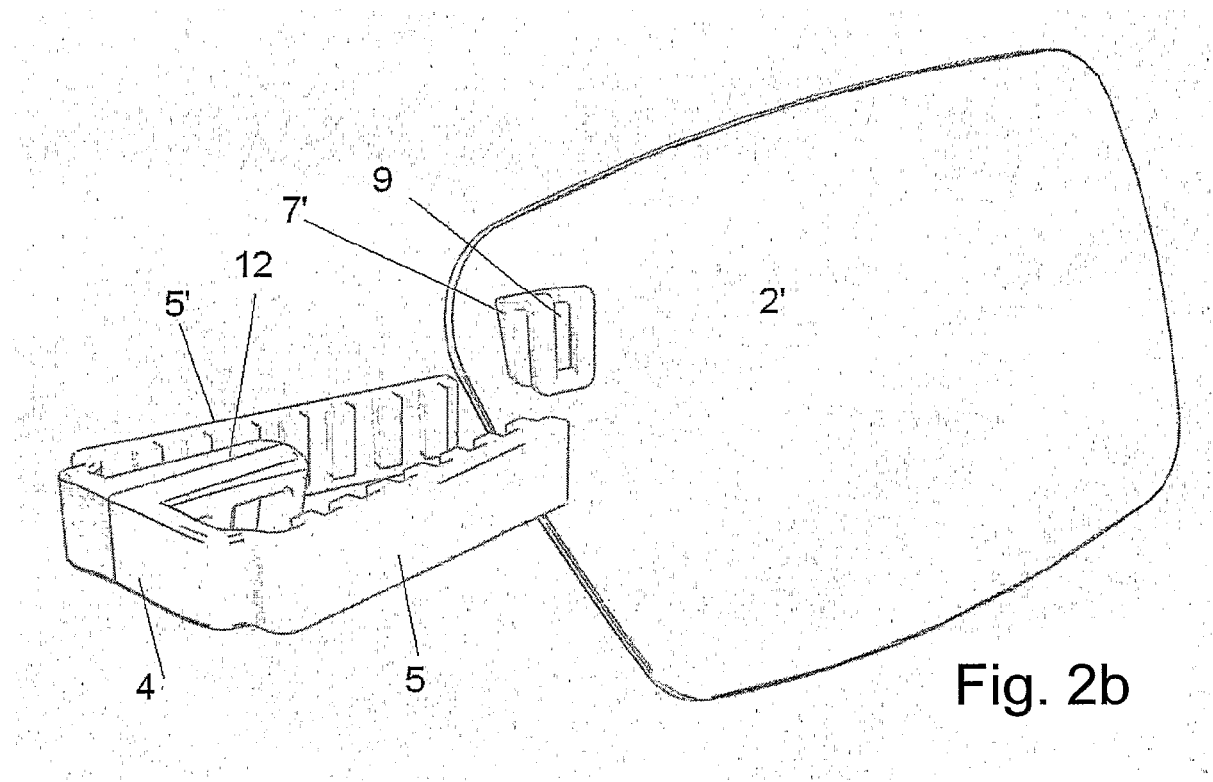

The bridge itself is shown in a three-dimensional perspective view on FIG. 2b and in a slightly modified version on FIG. 2a. The bridge 3 is largely U-shaped with a middle section 4, hook 12, arms 5, 5' extending in continuation of the middle section 4. The arms 5, 5' and the middle section 4 form a shape which has substantially U-shape. The arms 5 and 5' are provided with teeth/pins 6 which are used for adjusting the distance between the spectacle glasses of the clip-on spectacles. At each glass there is provided a fastening means 7 which is also U-shaped with two legs 10 and 11 that constitute front side 10 and back side 11 of the fastening means 7. The fastening means 7 has a bonding surface 8 on the rear leg 11 for bonding on the glass. The foremost leg 10 has a cutout 9 for receiving one of the teeth 6 in the cutout 9. The fastening means 7 thereby acts as a clip around the arm 5 and 5', respectively, which are prevented from sliding in the clips 7 due to the tooth 6 being secured in the cutout 9.

By choosing a suitable tooth 6 in the cutout 9, the spacing between the two clip-on spectacle glasses is adjusted. After placing the arms 5, 5' in the clips 7, the excess part of the arms 5, 5' are cut off in order not to cover unnecessary area of the spectacle glasses.

The bridge 3 is furthermore provided with a hook 12 for pinching on the bridge of the spectacles on which the clip-on spectacles are fastened. This is shown in greater detail in FIG. 1c, where the clip-on spectacles with its two glasses 2 and 2' and the bridge 3 are fastened on another pair of spectacles 13. The hook 12 of the bridge 3 of the clip-on spectacles grips around the bridge 14 of the other spectacles 13.

As shown on FIG. 2 and in another perspective view on FIG. 3a, the bridge 3 is resiliently prestressed towards the hook 12, so that the bridge 3 in the unloaded condition assumes a shape which is largely U-shaped, where the two arms 5, 5' with their ends are facing each other under a certain angle. Alternatively, the arms 5, 5' may also be parallel in the unloaded condition, but in that the arms 5, 5' are facing each other, it is ensured that the glasses are pressing against each other for storage purposes.

I FIG. 3b is shown the bridge 3, where the arms 5, 5' are bent in direction against the middle section 4, so that they, together with the middle section 4, are approximately on a straight line. This corresponds to the situation shown on FIG. 1, where the clip-on spectacles with the bridge 4 are hooked behind the bridge 14 of the other spectacles, and the arms 5, 5' are pressed forwards so that their elastic force against the hook 12 is pressing the glasses 2, 2' against the glasses of the other spectacles 13.

According to the type of spectacles, such as spectacles with metal frame or acetate, there will different distances from the bridge of the clip-on spectacles to the back side of the bridge of the other spectacles. In order to adapt the bridge 3 of a pair of clip-on spectacles according to the invention, the hook 12 as shown on FIG. 2 is provided with two hooks 16 and 16'. This is shown in a cross-section through the middle section 4 on FIG. 3c. Used together with acetate spectacles or another kind of spectacles where the bridge is rather thick, one barb 16' can be cut off the hook 12. Alternatively, spectacles with a metal frame will have bridge which is not so far from the bridge of the clip-on spectacles, and typically the innermost barb 16' will be utilised, whereby the outermost barb 16 can be cut off the hook 12.

A general feature of a bridge as shown on FIGS. 3a and 3b is that a first force is required to press the arms 5 and 5' to an approximately straight position shown on FIG. 3b, but a larger force is required to press the arms still further against the elastic force exerted by the bridge. This may also be allowed for in connection with the force with which the clip-on spectacle glasses are pressing against the glasses of the other spectacle, as the bridge is designed so that the two spectacle glasses from the clip-on spectacles may be pressed away from each other relatively easily, though with increasing force, so that the final part, where the arms 5, 5' are pressed out into an approximately parallel position with the middle piece 4, as shown on FIG. 3b, this implies a greater force action, which is used to press the glasses 2, 2' of the clip-on spectacles against the glasses of the other spectacles 14.

In that connection it is to be emphasised that the bridge 3, as shown on FIGS. 3a and 3b, are designed with bends 17 that acts as resilient hinges.

Figure 5A:
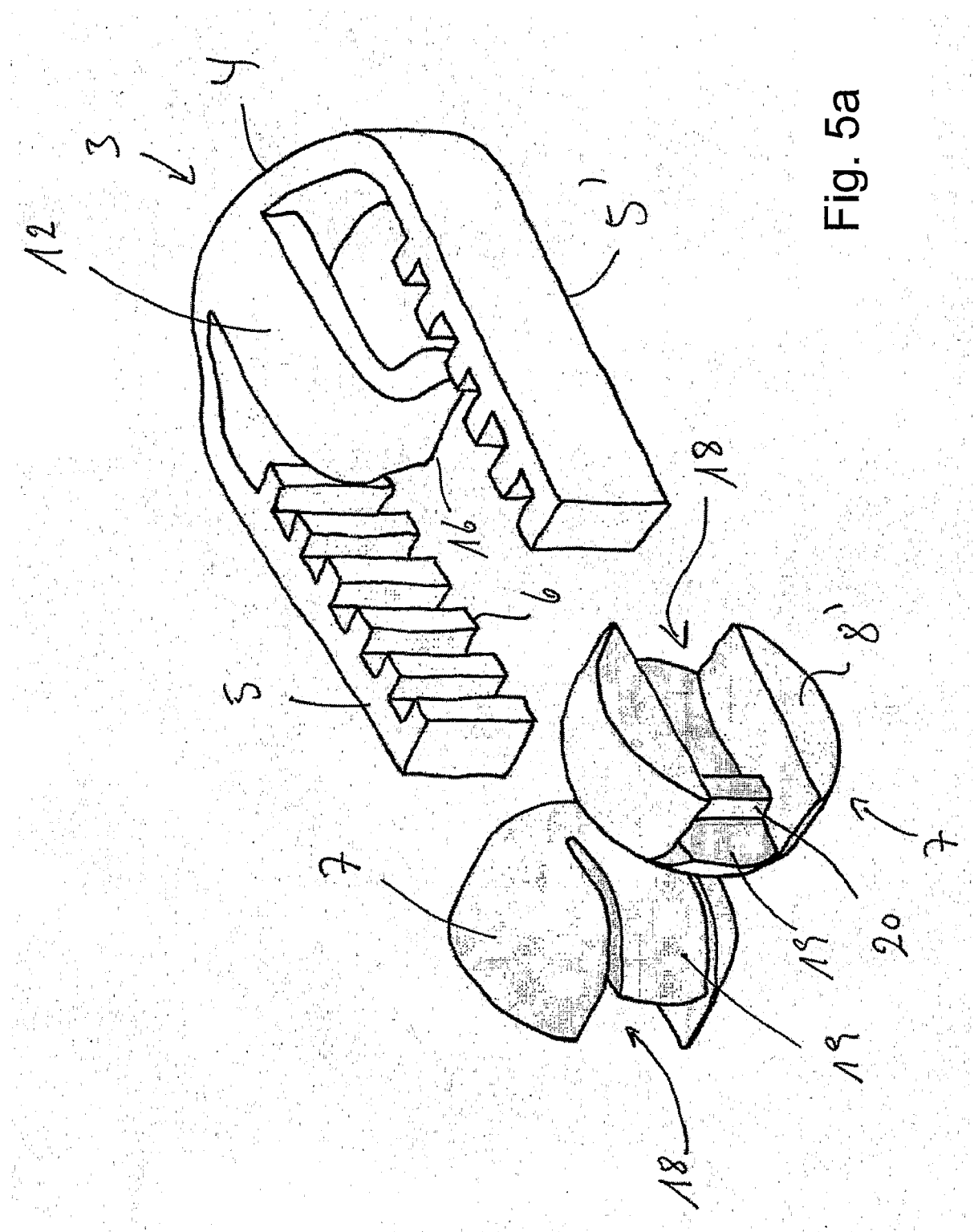
FIG. 5a) shows a further embodiment in three parts and 5b) how the parts are assembled and fastened on the glass.
Figure 5B:
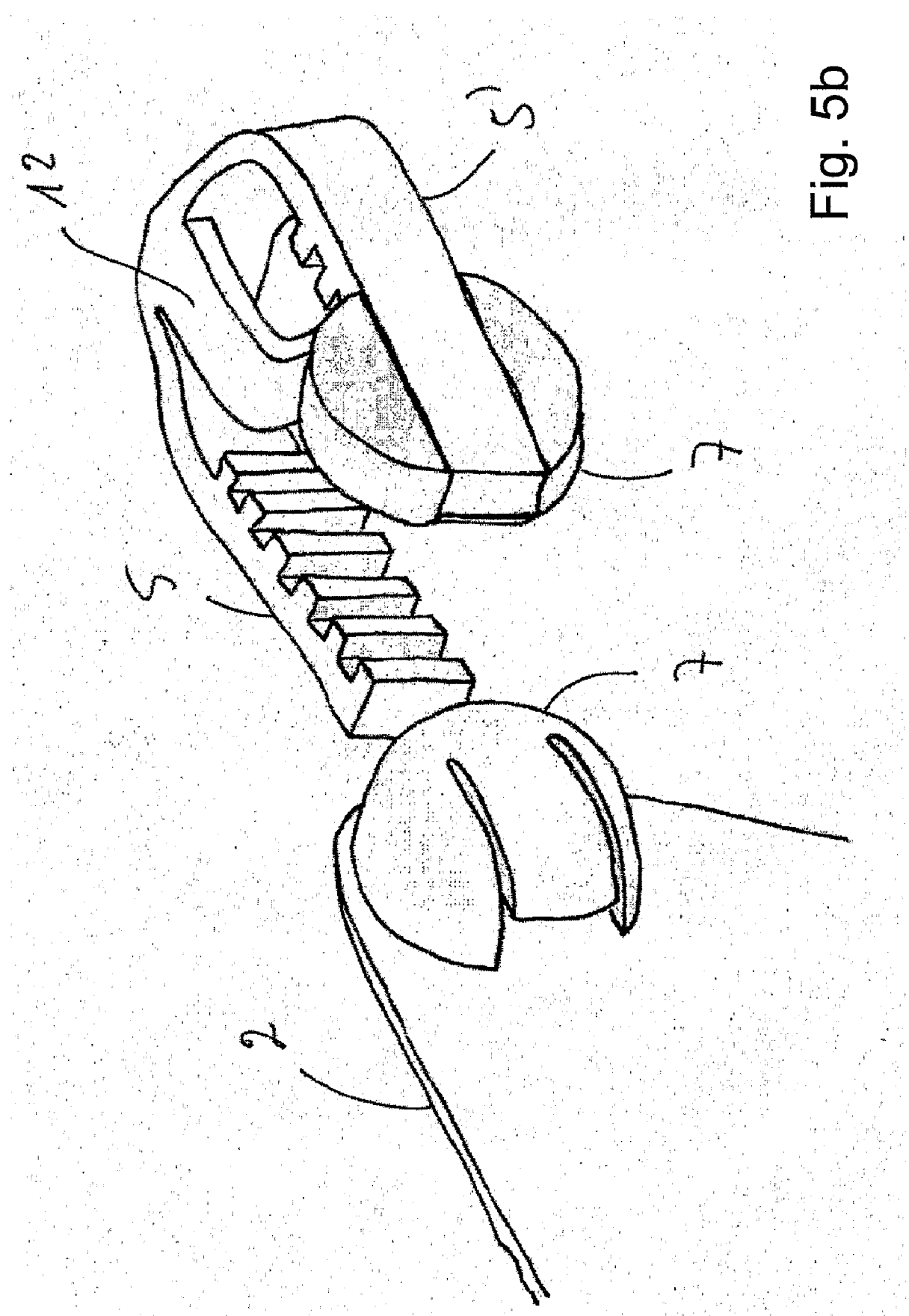

A second embodiment, which is related to the embodiment of FIG. 2, is shown on FIGS. 5a and 5b. Here, the bridge 3 is also designed with arms 5 and 5', and teeth 6 and a hook 12 on the middle section 4. There is only a single barb 16 on the hook 12. In this embodiment, the difference is the fastening means 7 which are approximately hemispherical with a face 8' for bonding to the glass of the clip-on spectacles, whereby a duct 18 appears through the hemisphere, through which the leg 5 and 5', respectively, can extend, which is most clearly seen on FIG. 5b.

A barb 19 with a projection 20 as shown on FIG. 5a is adapted to yield when an arm 5 or 5', respectively, is pressed through the duct 18, whereby the barb 19 is pressed outwards and the projection 20 can click in between two of the teeth 6 in order thereby to secure the arms 5 and 5', respectively, in the duct 18. The barb 19 is designed so that it is automatically pressed away from the arm 5 and 5', respectively, when it is pressed with its end through the duct 18, but which is acting as a barb and retains the arm 5 and 5', respectively, when pulling in the opposite direction. In order to loosen the arm 5, 5' after providing in the duct 18, the barb 19 may, e.g. by means of a finger nail, be pressed in direction away from the glasses of the clip-on spectacles, entailing release of the arm 5 and 5', respectively.

Figure 4:
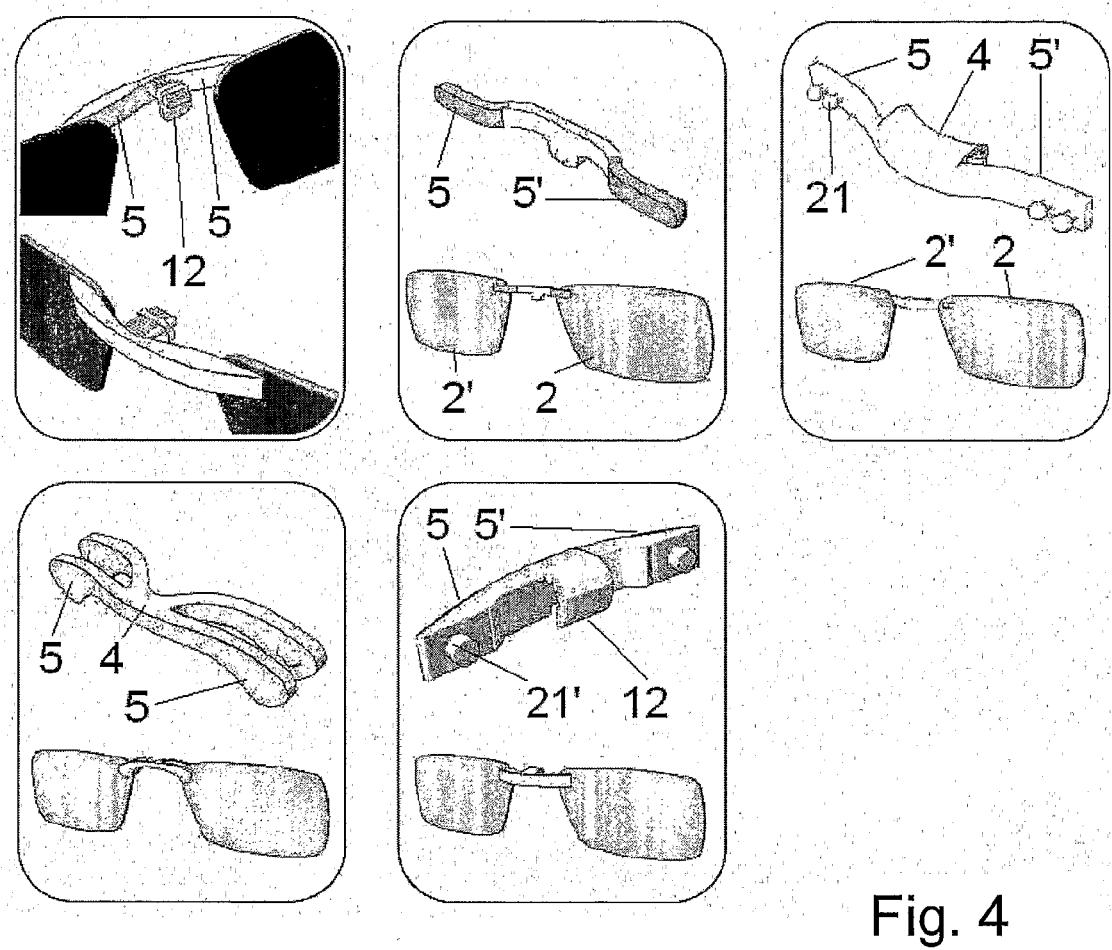
FIG. 4 shows various alternative embodiments.

On FIG. 4 is shown a number of other embodiments that have the function of, on the one hand, to grip around the bridge of the other spectacles (irrespective the fact that a required hook therefore does not appear clearly from all the drawings), and where the arms in continuation of the middle section 4 press the glasses against the glasses of the other spectacles. It is noted that the various bridges are shown in extended state, where the arms 5, 5' are largely in parallel with the middle section 4. However, it is implied that these embodiments are elastically prestressed too so that the arms 5, 5' will form a U-shape when not loaded.

At the top left of FIG. 4 is shown an embodiment of a bridge according to the invention, where the arms 5, 5' are provided with some projections 21 for accommodating holes in the glasses 2 and 2', where the projections 21 act as rivets which are fastened in the glasses 2 and 2' by heat action or ultrasound welding. A corresponding riveting effect can be achieved with the projections 21' shown at the lower left on FIG. 4.

A pinching action about the glassed can be achieved with a bridge 3 shown at the lower left on FIG. 4. The bonding of the arms 5, 5' on the glasses 2, 2' is used with a bridge as shown at the top centre on FIG. 4.

Figure 6A:
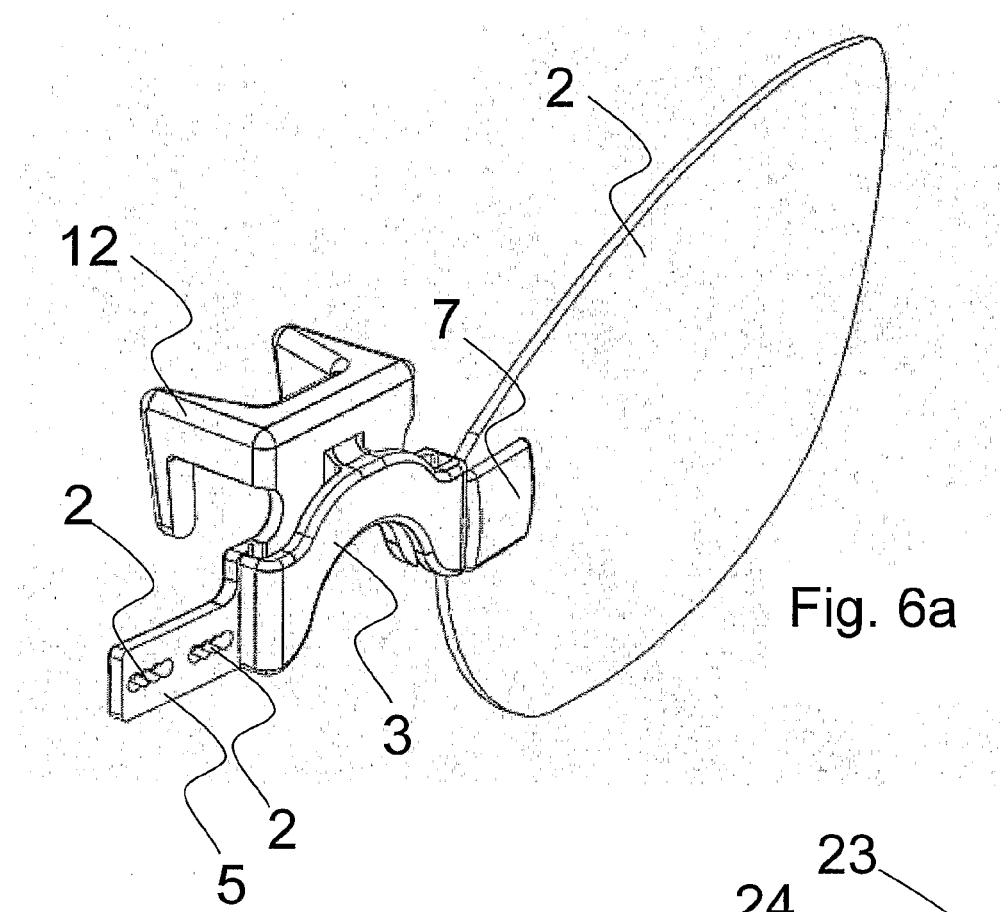
FIG. 6a) shows a bridge with one spectacle glass according to yet an embodiment and 6b) shows a spectacle glass and fastening clip with lock.
Figure 6B:
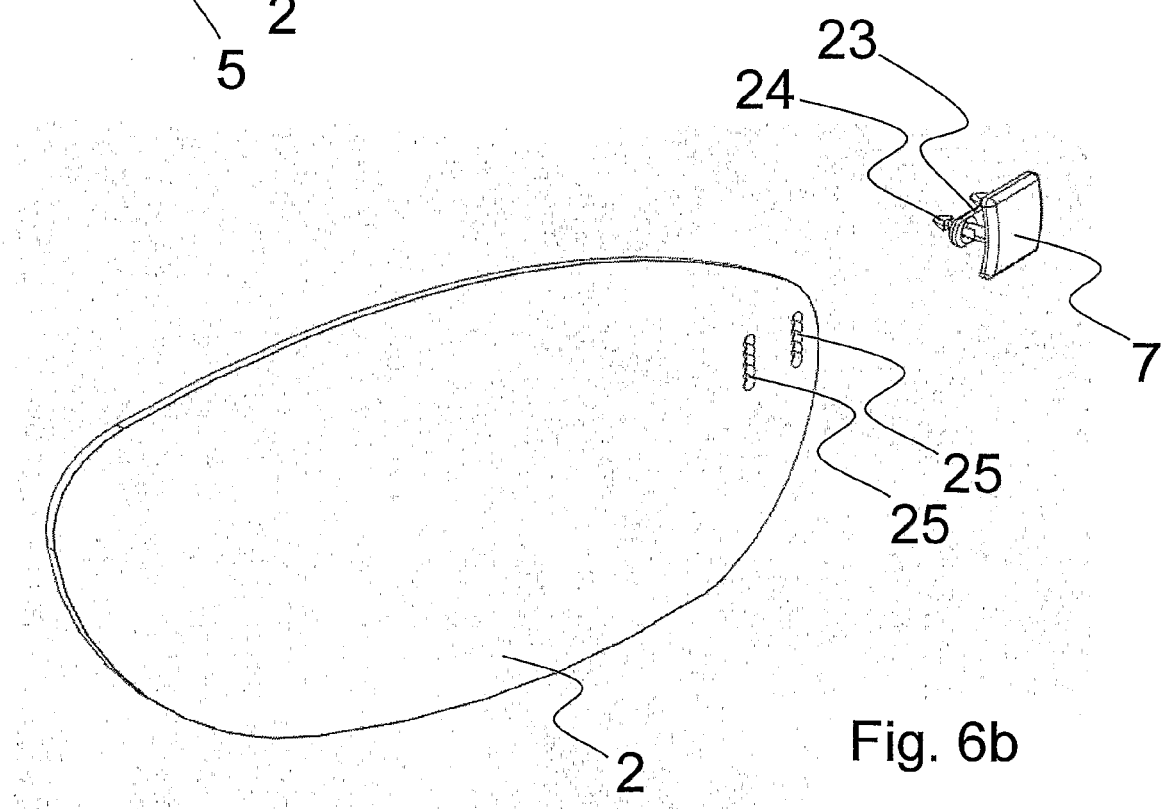

A further preferred embodiment of a bridge according to the invention is shown in FIG. 6a and FIG. 6b, where a variant with the option of adjusting width as well as height of the glasses 2 relative to the bridge is possible. The bridge 3 is fixed to the glass 2 with a fastening means 7 which in this variant is called a fastening clip 7. As it appears in FIG. 6a, there are two horizontal cutouts 22 in the arm 5, which cutouts in the shown variant are with a kind of subdivisions which may facilitate the adjusting of the glass 2 relative to the arm 5, as these subdivisions will act as adjustment steps. In FIG. 6b appears a glass 2 and the mentioned fastening clip 7. This clip 7 is with two projecting pins 24 with barbs that fit into the two cutouts 22 in the arm 5. The clip 7 is made of an elastic material where at least the head of the clip 7 by fixing when bearing on the glass 2 or the arm 5 will ensure a spring force which is sufficient to fix the glass 2 to the arm 5 so that a stable joint is achieved. The fastening clip 7 is fixed with a locking plate 23 which is pressed down upon the two pins 24. On this Figure it furthermore appears that also the glass 2 is with cutouts 25 corresponding the cutouts 22 in the arm 5, except for the fact that the former 25 are horizontal. By this solution, a manifold adjusting possibility is achieved.

There is thus a wide possibility of variation of bridges for clip-on spectacles according to the invention, where it is, however, to be mentioned that the embodiment on FIGS. 2 and 6 are the most preferred, as they fulfil a large number of requirements to a bridge for a clip-on spectacles according to the invention. Such a bridge has the following advantageous properties:

- The clip-on spectacles fit to acetate spectacles as well as spectacles with metal frames.
- The width between the sunglass glasses of the clip-on spectacles may be adapted to various distances between the glasses of other spectacles, as well as the height between glasses and bridge may be adapted.
- The bridge does not contain any metal parts, eliminating the risk of scratches on the spectacle on which the clip-on spectacles are put, and reduces the risk of allergy at the person carrying the spectacles.
- The bridge is easy to mount for the optician.
- The bridge is universal and can be used for all types and shapes of clip-on spectacles.
- The bridge can be fastened on the spectacle glasses at various heights in order thereby to be adapted to the other spectacles on which the spectacles are to ride, whereby the bridge itself becomes as little visible as possible.
- The elastic force presses the lenses together when the clip-on spectacles are stored, whereby they take up as little space as possible.

As it appears from the above and the Figures, by the invention there is provided a bridge for clip-on spectacles and clip-on spectacles with such a bridge which in a simple way fulfil a large number of needs so that clip-on sunglasses are universal and yet easy and cheap to produce.

What is claimed is:

1. A pair of clip-on spectacles for fastening to another pair of spectacles, where the clip-on spectacles includes a pair of glasses which are interconnected by a bridge, where the bridge can yield for collapsing the clip-on spectacles so that the two glasses come into contact with each other, wherein the bridge is substantially made with a resiliently yielding U-shape in order that during storage of the clip-on spectacles, the two glasses of the clip-on spectacles can be pressed against each other for minimizing necessary storage space; wherein the clip-on spectacles have an resiliently bendable bridge with a hook at the middle of the bridge for fastening behind the bridge of said another pair of spectacles, where the bridge of the clip-on spectacles is resiliently prestressed towards the hook so that by fastening on said another pair of spectacles, the glasses of the clip-on spectacles are pressed against the glasses of said another pair of spectacles.

2. Clip-on spectacles according to claim 1, wherein the glasses are without frames around the glasses.

3. Clip-on spectacles according to claim 1, wherein the bridge has a middle section with a lateral hook extending therefrom for fastening behind the glasses of said another pair of spectacles, and two arms extending in continuation of the middle section, where the two arms are provided with a number of teeth in succession along the arm, where at each of the glasses of the clip-on spectacles, a fastening means is provided which is adapted to receive a tooth for fastening the arm in the fastening means, where the length of the bridge between the glasses of the clip-on spectacles is adjustable when selecting the tooth which is fastened in the fastening means.

4. Clip-on spectacles according to claim 3, wherein each of the fastening means is U-shaped with two legs between which one of the arms of the bridge is secured, of which the outer side of one leg is fastened to the glass and where the other leg has a cutout for receiving the tooth of an arm.

5. Clip-on spectacles according to claim 4, wherein the fastening means at the outer side of one leg has a bonding surface for bonding on the glass.

6. A pair of clip-on spectacles for fastening to another pair of spectacles, where the clip-on spectacles includes a pair of glasses which are interconnected by a bridge, where the bridge can yield for collapsing the clip-on spectacles so that the two glasses come into contact with each other, wherein the bridge is substantially made with a resiliently yielding U-shape in order that during storage of the clip-on spectacles, the two glasses of the clip-on spectacles can be pressed against each other for minimizing necessary storage space; wherein only the bridge has a hook, while the glasses are without hooks.

7. Clip-on spectacles according to claim 6, wherein the glasses, are provided with projections of synthetic material for bearing against the glasses of said another pair of spectacles in order thereby to keep apart the glasses of the clip-on spectacles and the glasses of said another pair of spectacles.

8. A pair of clip-on spectacles for fastening to another pair of spectacles, where the clip-on spectacles includes a pair of glasses which are interconnected by a bridge, where the bridge can yield for collapsing the clip-on spectacles so that the two glasses come into contact with each other, wherein the bridge is substantially made with a resiliently yielding U-shape in order that during storage of the clip-on spectacles, the two glasses of the clip-on spectacles can be pressed against each other for minimizing necessary storage space; wherein the bridge has a middle section with a lateral hook extending therefrom for fastening behind the glasses of a second pair of spectacles, and two arms extending in continuation of the middle section, where the two arms are provided each with several holes in succession along the arm, where at each of the glasses of the clip-on spectacles, holes are arranged where these holes correspond to holes in the arms and where the glasses of the spectacles are fixed with a fastening means, which is adapted to be mounted through the glass and through the arm, where the length of the bridge between the glasses of the clip-on spectacles is adjustable when selecting the positions of glasses, arms and fastening means.

9. Clip-on spectacles according to claim 8, wherein the glass is adjustable in two directions, where the fastening means is fixed with a lock.

10. Clip-on spectacles according to claim 8, wherein the fastening means are made with built-in spring action.

11. Clip-on spectacles according to claim 8, wherein the hook has two barbs at different lateral distances from the middle section for adapting to various thicknesses of the bridge of said another pair of spectacles.

12. Clip-on spectacles according to claim 8, wherein the bridge is made of synthetic material.

\* \* \* \* \*